Nov. 1, 1955　　　B. J. KELLY ET AL　　　2,722,265
METHOD OF MAKING DECORATIVE LINOLEUM PRODUCTS
Filed June 5, 1951

INVENTORS
BERNARD J. KELLY
BY FREDERICK G. MAYER

Albert Sperry
ATTORNEY

United States Patent Office 2,722,265
Patented Nov. 1, 1955

2,722,265

METHOD OF MAKING DECORATIVE LINOLEUM PRODUCTS

Bernard J. Kelly, Pennington, N. J., and Frederick G. Mayer, Morrisville, Pa., assignors, by mesne assignments, to Congoleum-Nairn Inc., Kearny, N. J., a corporation of New York Application June 5, 1951, Serial No. 229,936

10 Claims. (Cl. 154—25)

This invention relates to linoleum products and methods of producing the same and is directed particularly to improvements in the products and methods described in the application of Dobry Serial No. 143,080, filed February 8, 1950, and now Patent No. 2,624,068, and the application to Benedict et al., Serial No. 191,442, filed October 21, 1950.

The Dobry application referred to above relates to methods of calendering linoleum compositions wherein one or both rolls of the calender are continuously washed or cleaned so as to remove any adhering film of linoleum composition from the surfaces of the rolls whereby they present freshly cleaned surfaces to the composition being calendered. It is found that this process serves to reduce the tendency of the calender rolls to elongate and striate the material being calendered with the result that particles or pieces of linoleum composition are subjected to limited distortion. In accordance with the application of Benedict et al. referred to above pieces of linoleum composition which are relatively flat and from about ½ to 1½ inches in their largest dimension are fed to continuously cleaned calender rolls whereby the pieces are partially distorted but individually identifiable design elements are formed in the exposed face of the resulting calendered sheet. These elements are infinitely varied but generally elongated in a common direction and prominent design elements present generally parallel sides with one transversely extending well defined end, whereas the opposite end of the design element is generally obscured.

In accordance with the present invention, the designs of the general character produced by the use of the Dobry and Benedict et al. processes are modified and given an unusual and attractive appearance wherein at least a portion of the design elements are provided with a marginal fringe which differs in color or appearance from the main body of the design element. This result is attained by pressing together differently colored layers of linoleum composition so as to form a laminated sheet from which the flat pieces of composition fed to the calender are produced. In some instances, two differently colored layers of composition are laminated together after which the cut pieces are tumbled or mixed about so that differently colored faces of the pieces are presented to the rolls of the calender. In other instances, three or more layers of linoleum composition are laminated together with the intermediate layers contrasting in color or appearance from the outer layers of the laminated sheet. In any case, when the pieces of linoleum composition fed to the calender embody a plurality of differently colored layers, the operation of elongating and partially distorting the pieces during the calendering operation results in the formation of a fringe or thin marginal edging about a portion of the design elements so that these edges stand out more prominently. Designs which are very distinctive and unusual are thus produced and they may in some instances have somewhat the general appearance of agate or onyx, or the product may have a laminated or even scaly appearance.

One of the objects of the present invention is to provide an improved method of producing linoleum products wherein pieces of laminated linoleum composition are calendered together into a unitary sheet.

Another object of the invention is to provide a method whereby design elements in a linoleum product may be provided with marginal fringes of contrasting appearance.

A further object of the invention is to provide methods whereby linoleum products having characteristic agate or onyx type designs are embodied in the product.

These and other features and objects of the present invention will appear from the following description thereof in which reference is made to the figures of the accompanying drawing.

Figure 1:
Fig. 1 is a plan view of a typical piece of linoleum composition embodying the present invention.

In that form of the invention illustrated in Fig. 1, various elements of the design are indicated at 2, 4 and 6. The main body of these elements is of one general color or appearance, whereas the marginal edges of the elements present fringes as indicated at 8 and 10 which contrast in color with the main body or extended area of the design element. The design elements may have a main body consisting of a single color or they may be marbleized or variegated throughout the body and have marginal fringe composed of two generally parallel lines or zones. Thus for example the main body of each element may be gray or blue whereas the marginal zone 8 may be yellow and the marginal zone 10 may be red. Such a fringe or marginal portion of the design element sets off the element in a manner to emphasize its outline and to separate or distinguish one element from another even though they may, as in the case of the elements 2 and 4, appear in at least partially overlapping relation.

Figure 2:
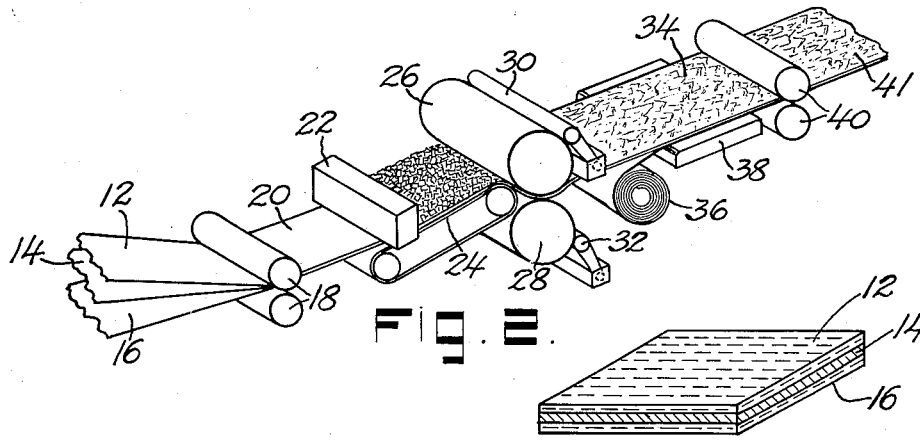
Fig. 2 is a diagrammatic illustration of typical equipment which may be used in the practice of the present invention.
Figure 4:
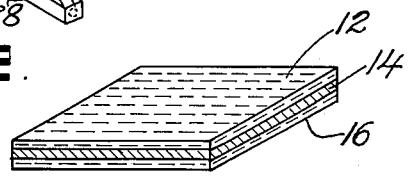
Figs. 3 and 4 are perspectives of a typical piece of laminated linoleum composition used in the practice of the present invention.
Figure 3:
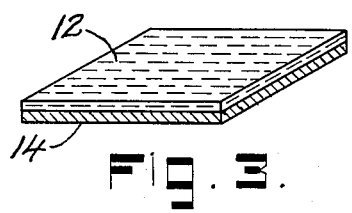

Typical equipment which may be used in producing the product of Fig. 1 is indicated diagrammatically in Fig. 2 wherein layers of material 12, 14 and 16 are passed between the press rolls 18 so as to form a laminated sheet 20. This sheet is passed to a cutting device indicated generally at 22 which serves to cut or break up the laminated sheet into pieces which may be square, circular or irregular in outline, but as shown in Figs. 3 and 4, these pieces are preferably square. The cut pieces are deposited on a conveyor 24 which serves to feed the pieces to the calender rolls 26 and 28. One or both of the calender rolls is provided with a washing device or other means indicated at 30 and 32 for applying a cleaning agent to the rolls and for removing the agent from the rolls so as to wash away or remove any adhering film of linoleum composition remaining on the rolls as they rotate. The rolls are thus caused to present freshly cleaned surfaces to the pieces of linoleum composition being calendered. The resulting calendered sheet 34 is preferably bonded to a layer of backing material and for this purpose a web of asphalt saturated felt, burlap or other backing is supplied from the roll 36 and is passed over the bed 38 to the press rolls 40. The assembled backing and calendered sheet indicated at 41 may then be passed to heaters, driers or curing apparatus. If preferred the calendered sheet 34 may be severed into blocks, tiles or other design elements for assembly in inlaid patterns and thereafter bonded to a layer of backing material.

As shown in Fig. 3 the pieces of laminated material may embody the layers 12 and 14 only, but as shown in Fig. 4, the laminated pieces may embody three layers 12, 14 and 16. When the two layer pieces of Fig. 3 are employed, the layer 12 for example may have a gray color whereas the layer 14 may have a green color. These pieces when cut from the sheet 20 by means such as that indicated generally at 22 will present one gray face and one green face. By mixing, tumbling or inverting at least a part of the pieces, the mixture being fed to the calender roll will present some gray faces and some green faces to each calender roll. As the pieces are elongated and somewhat distorted during their passage between the calender rolls, the lower layer of any particular piece will be caused to spread out about the edges of the upper face of the piece so as to present a marginal fringe which contrasts in color with the main body of the design element. This fringe is generally more pronounced or apparent along one end of the elongated element than at the sides or opposite end with the result that the directional character of the design as a whole is emphasized by the prominent fringed edges facing in a common direction.

When laminated pieces supplied to the calender roll embody three layers of material as shown in Fig. 4, the upper and lower layers 12 and 16 may be of the same or different colors, whereas the intermediate layer 14 contrasts in color or appearance with both of the layers 12 and 16. When such pieces are passed between the calender rolls the intermediate layer is squeezed out between the upper and lower layers presenting a marginal fringe contrasting in color with the main body of the design element. In a similar way, the bottom layer such as 16 of the piece in Fig. 4 is further squeezed out about the fringe formed by the layer 14. The design element is thus provided with a double marginal fringe as shown very clearly at 8 and 10 in Fig. 1. The laminated pieces of material being calendered obviously may be composed of any number of layers which differ in color or appearance from each other or from adjacent layers to produce a fringe about each design element having an appearance like that of the parallel edging or lines of agate or onyx.

Any one or more of the layers of material used in making up the pieces to be calendered may itself embody a plurality of colors and as shown in Fig. 1 the uppermost layer of the design elements are themselves composed of a marbleized or varied and multi-colored composition about which the contrasting fringes extend. Furthermore, by employing relatively thin layers of material in producing the pieces to be calendered, the uppermost layer may be so stretched or extended during the calendering operation that an intermediate or lower layer will show through to a limited extent within the main body of the design element. Thus as indicated at 42 in design element 6, the composition has been partially broken or extended to such thinness that the lower or intermediate layer of contrasting color is partially exposed. In this way the design elements themselves may be variegated in appearance either by a preliminary operation prior to forming the laminated pieces or as an incident to the calendering operation by which the finished sheet is produced.

In carrying out the present invention the thickness of the individual pieces fed to the calender rolls is preferably somewhat greater than the spacing of the rolls themselves. The calender rolls further may be rotated at somewhat different speeds so as to increase or modify the distortion and elongation of the design elements in the finished product. The design elements are all elongated in the same general direction by the calendering operation and the fringes about the edges of the elements are more pronounced adjacent one end and along the sides of the elements than at the other end. In this way the elements give an overlapping or laminated appearance which in some instances may even be scaly in character.

The formation of such characteristic designs in linoleum products is effected by reason of the continuous cleaning of one or both of the calender rolls whereby the amount of distortion is generally insufficient to obliterate the design elements altogether. They are instead blended together into a unitary design which has a flowing appearance and directional character yet embodies a plurality of readily identifiable and partially outlined design elements. The choice of colors embodied in any one or more layers of the laminated pieces used in the practice of the present invention can be varied greatly. When three or more layers of material are employed each may differ in color from all the others. Pieces cut from different laminated sheets may be mixed to produce designs in which the fringes of different design elements may contrast with one another and from the main portions of the design elements as well. A somewhat subdued design results when using two layer laminated pieces in which case the fringes about the edges of the pieces are generally less prominent. A general uniformity of color throughout the design is obtained when the uppermost and lowermost layers of the laminated pieces are of the same or similar colors or shades while the intervening layer is of a contrasting color. In such cases the design elements are substantially uniform in appearance although varying infinitely in outline and arrangement and the marginal fringes set off the elements and emphasize their varying configuration. It will thus be apparent that designs which differ greatly in character and appearance may be produced by variations in operation consistent with the present invention.

The manner in which the rolls of the calender are cleaned may be varied. Thus a solvent for the linoleum composition may be used but other cleaning agents such as synthetic detergents or cleaning powders or slurries may be applied to and removed from the calender rolls as they rotate to remove adhering linoleum composition therefrom. The rolls are preferably wiped for removing the cleaning agent and adhering linoleum composition, as described in the co-pending application of Dobry Serial No. 143,080. The cleaning means indicated generally at 30 and 32 are preferably of the type shown and described in the application of Benedict et al. Serial No. 175,410.

The temperature to which the calender rolls are heated and the speed of rotation may be varied and numerous other changes and modifications may be made in the manner of controlling and operating the calender. In view thereof it should be understood that the particular methods and products described above are intended to be illustrative only and are not intended to limit the scope of the invention.

We claim:

1. The method of producing a linoleum product which comprises the steps of pressing differently colored layers of linoleum composition together to produce a laminated sheet, cutting the laminated sheet into flat pieces each of which embodies all of said differently colored layers of composition throughout the area thereof, feeding said pieces to a pair of calender rolls in a loose irregular but generally parallel and overlapping relation, separating the resulting calendered sheet from said rolls, applying a cleaning agent to at least one of said rolls, and removing said agent and adhering linoleum composition from said roll so that the roll will continuously present a freshly cleaned surface to the pieces being calendered.

2. The method of producing a linoleum product which comprises the steps of pressing two differently colored layers of linoleum composition together to form a laminated sheet, cutting the laminated sheet into flat pieces which are of different colors on opposite faces thereof, inverting a portion of said pieces and passing them to a pair of calender rolls in a loose, irregular but generally parallel and overlapping relation with pieces in adjacent positions presenting differently colored faces to said rolls, separating the resulting calendered sheet from said rolls, and applying a cleaning agent to at least one of said rolls and removing said agent and adhering linoleum composition from said roll so that the roll will continuously present a freshly cleaned surface to the pieces being calendered.

3. The method of producing a linoleum product which comprises the steps of arranging at least three layers of linoleum composition in superimposed relation with a central layer differing in color from the two outer layers, pressing said layers together to form a laminated sheet, cutting the laminated sheet into flat pieces each of which embodies all of said layers of linoleum composition extending throughout the area thereof parallel to the opposite faces of said pieces, feeding said pieces to a pair of calender rolls in a loose, irregular but generally parallel and overlapping relation, separating the resulting calendered sheet from said rolls, applying a cleaning agent to at least one of said rolls and removing said agent and adhering linoleum composition from said roll so that the roll will continuously present a freshly cleaned surface to the pieces being calendered.

4. The method of producing a linoleum product which comprises the steps of pressing a plurality of differently colored layers of linoleum composition together to produce a laminated sheet, cutting the laminated sheet into flat pieces which are from about ½ to 1½ inch in their greatest dimension and embody a plurality of differently colored layers of composition, feeding said pieces to a pair of calender rolls, maintaining the distance between said rolls less than the thickness of said pieces, separating the resulting calendered sheet from said rolls, applying a cleaning agent to both of said rolls and removing said agent and adhering composition, from said rolls so that both rolls will continuously present freshly cleaned surfaces to the pieces being calendered.

5. The method of producing a linoleum product which comprises the steps of pressing three differently colored layers of linoleum composition together to form a laminated sheet, cutting the laminated sheet into a plurality of flat pieces, mixing said pieces so that they present differently colored faces in adjacent relation, feeding the mixed pieces while in a loose, irregular but generally parallel and overlapping relation to a pair of calender rolls, separating the resulting calendered sheet from said rolls, applying a cleaning agent to both of said rolls and removing said agent and adhering composition from said rolls so that both rolls will continuously present freshly cleaned surfaces to the pieces being calendered.

6. The method of producing a linoleum product which comprises the steps of laminating together differently colored layers of linoleum composition to produce a sheet in which the differently colored layers extend parallel to opposite faces of the sheet, breaking up said sheet into relatively small flat pieces, assembling the pieces in irregular, generally parallel and overlapping relation and pressing the pieces together in a direction generally normal to said opposite faces to form an integral sheet wherein intermediate layers of differently colored composition are squeezed outward from between the layers forming said opposite faces of said pieces so as to be visible about the edges of the pieces to at least partially define the outline thereof in the pressed sheet with a fringe of said different color.

7. The method of producing a linoleum product which comprises the steps of laminating together differently colored layers of linoleum composition to produce a sheet in which the differently colored layers extend parallel to opposite faces of the sheet, breaking up said sheet into relatively small flat pieces, and feeding said pieces in irregular arrangement and partially overlapping relation to calender rolls with the opposite faces of said pieces presented to said rolls so that an intermediate differently colored layer will be squeezed outward at the edges of the pieces during the calendering operation and as the pieces are compressed together into a unitary sheet whereby the edges of the pieces are at least partially defined in the unitary sheet by a marginal fringe of said differently colored composition.

8. The method of producing a linoleum product which comprises the steps of laminating together differently colored layers of linoleum composition to produce a sheet in which the differently colored layers extend parallel to opposite faces of the sheet, severing said sheet into relatively small pieces each of which contains a portion of each of said layers in substantially undistorted laminated relation, assembling the pieces in irregular and overlapping relation and pressing the pieces together to form an integral sheet wherein intermediate layers of differently colored composition are squeezed outward from between adjacent layers of said pieces so as to be visible in the pressed sheet.

9. The method of producing a linoleum product which comprises the steps of laminating together differently colored layers of linoleum composition to produce a sheet in which the differently colored layers extend parallel to opposite faces of the sheet, severing said sheet into relatively small pieces each of which contains a portion of each of said layers in substantially undistorted laminated relation, and feeding said pieces in irregular arrangement and partially overlapping relation to calender rolls so that an intermediate differently colored layer will be squeezed outward from between adjacent layers of said pieces during the calendering operation and as the pieces are compressed together into a unitary sheet, and continuously cleaning the calender rolls so as to remove any adhering composition therefrom and limit the distortion of said pieces during passage through the calender.

10. The method of producing a linoleum product which comprises the steps of forming a plurality of sheets of linoleum composition at least one of which sheets is of a color contrasting with that of the other sheets, laminating said sheets together with said contrastingly colored sheet located between the other sheets, severing the resulting laminated material into a plurality of flat pieces each of which embodies a portion of each of said layers extending parallel to the faces of the piece and having the contrasting color extending throughout the piece and to the edges thereof, feeding said pieces to the rolls of a calender while in an irregular but generally parallel and overlapping arrangement, elongating and bonding said pieces together into an integral sheet and simultaneously squeezing said contrastingly colored layer out beyond at least some edges of the other sheets embodied in the piece and thereby forming a fringe of said contrasting color about said edges within the integral sheet.

References Cited in the file of this patent

UNITED STATES PATENTS

| | | |
|---|---|---|
| 874,167 | Crow | Dec. 17, 1907 |
| 1,345,208 | Majewski | June 29, 1920 |
| 1,612,535 | Prifold | Dec. 28, 1926 |
| 1,763,314 | McConoughey | June 10, 1930 |
| 1,929,277 | Humphreys | Oct. 3, 1933 |
| 1,939,961 | Emig | Dec. 19, 1933 |
| 1,975,515 | Mayer | Oct. 2, 1934 |
| 2,113,158 | Mayer | Apr. 5, 1938 |
| 2,125,859 | Liebelt | Aug. 2, 1938 |
| 2,374,496 | Perry | Apr. 24, 1945 |
| 2,624,068 | Dobry | Jan. 6, 1953 |